No. 814,448. PATENTED MAR. 6, 1906.
M. HIRTH.
GAS LIGHT CHANDELIER.
APPLICATION FILED MAR. 10, 1904.
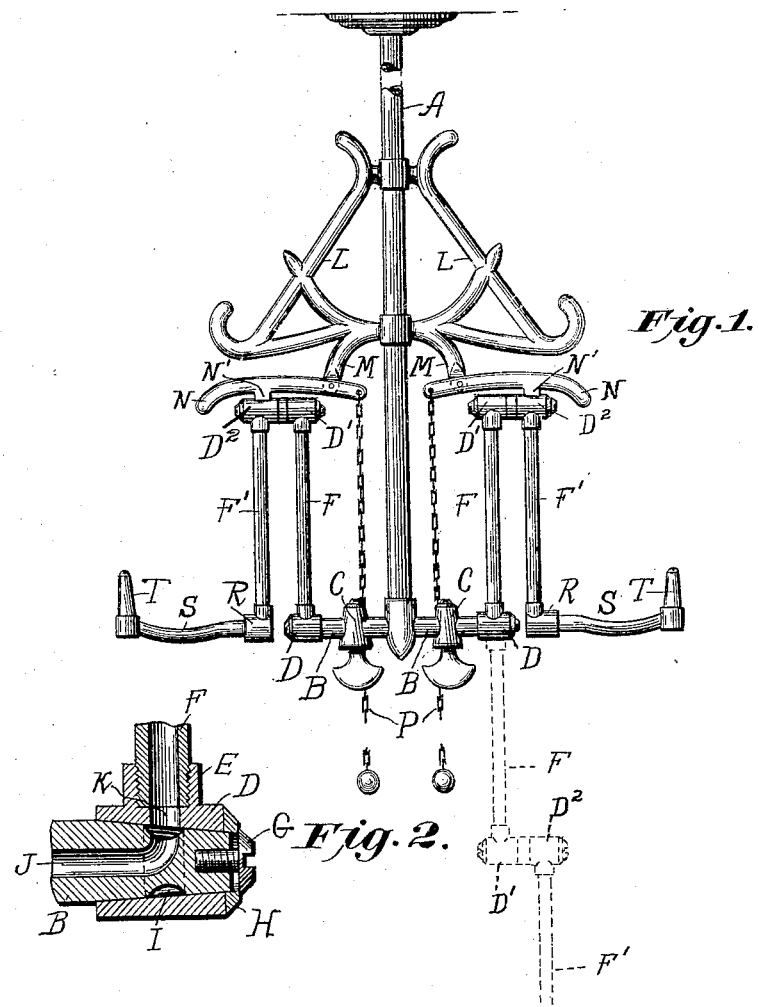
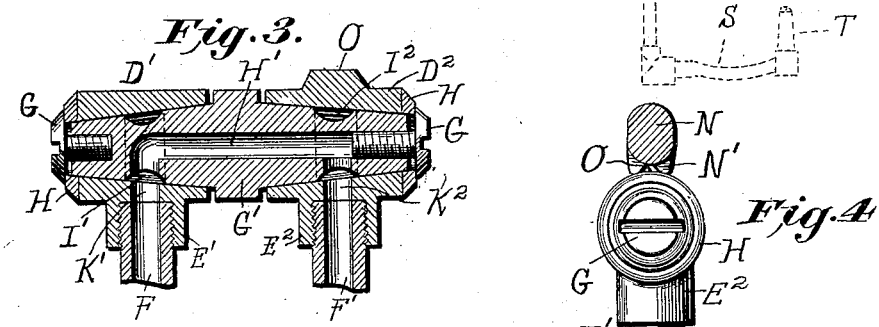
WITNESSES:
Elmer Leavey
J. B. Connolly
INVENTOR
Michael Hirth
BY H. C. Evert
Attorneys

UNITED STATES PATENT OFFICE.

MICHAEL HIRTH, OF BUTLER, PENNSYLVANIA.

GAS-LIGHT CHANDELIER.

No. 814,448.

Specification of Letters Patent.

Patented March 6, 1906.

Application filed March 10, 1904. Serial No. 197,579.

*To all whom it may concern:*

Be it known that I, MICHAEL HIRTH, a citizen of the United States, residing at Butler, in the county of Butler and State of Pennsylvania, have invented a new and useful Gas-Light Chandelier, of which the following is a specification.

My invention relates to gas-light chandeliers in which lights may be shifted so as to bring them down to a table to read or work by or be retained at proper height for ordinary lighting purposes. I attain these objects by the mechanism illustrated in the accompanying drawings, in which—

Figure 1 is an elevation of a chandelier constructed in accordance with my invention, showing the elevated position of the drop-lights in full lines and one of the drop-lights in the extended position in dotted lines. Fig. 2 is a longitudinal sectional view of the swing or swivel joint between one of the branch tubes or pipes of the chandelier and one of the extensible drop-lights. Fig. 3 is a longitudinal sectional view of the swivel-joint in the extensible drop-light. Fig. 4 is an end view of the same, showing the latch for holding the drop-light in elevated position in cross-section.

In the accompanying drawings, A represents the supply-pipe, which is usually passed through the ceiling, and this pipe is provided adjacent its lower ends with a plurality of branch tubes or pipes B, in each of which is a suitable stop-cock C. On the end of each of these tubes or branch pipes B is a swing or swivel joint, the construction of which is clearly illustrated in Fig. 2 of the drawings and consists of a union or fitting D, that is sleeved onto the tapered outer end of the branches B, and has a threaded neck or socket E to receive the pipe members F of the extensible or drop light. The branches B are preferably made solid at the end, as shown in Fig. 2, to receive screws G, the heads of which impinge against the washers H, that in turn engage against the outer ends of the sleeve or fitting D. The branches or tubes B are provided adjacent their ends with peripheral grooves I, which register with the gas-run J in the branches or tubes and with the outlet K of the sleeve or fitting D, leading to the pipes F. Pipes or tubes F' of equal length to the pipes F are provided, and the pipes or tubes F' are received at their upper ends in sockets E' E², which are sleeved to turn on the tapered ends of the swivel G'. The sleeves or fittings D' D² are held on the tapered ends of the swivel by washers H and screws G in the same manner as the fitting or sleeve D is held, and said fitting G' is provided with a gas-run H' and has peripheral grooves I I², which register through ports K' K² with the pipes F F'.

Secured to the supply-pipe A are brackets L, of any suitable form, and as many of which are provided as there are drop-lights, each bracket carrying an arm M, to which is pivoted a latch N, the notched boss N' on the lower face of which is adapted to engage with a lug O, provided on the outer face of the sleeves or fittings D². Being pivoted beyond the center of their length, the latches N are held by gravity in engagement with lugs and are operated to release by chains, cords, or other equivalent devices P. Fittings or unions R are secured to the lower ends of the pipes or tubes F and carry branches S, which support the burner-tips T.

The operation is simple, as it will be observed that when the cocks C are closed the gas is shut off from the burner-tips irrespective of whether the drop-lights are in their elevated position, as shown in full lines in Fig. 1, or in the lower position. (Shown in dotted lines in same figure.) When the cocks C are opened, the gas flows from supply-pipe A, the branches B, pipes F, gas-run H', pipes F', branches S to the burner-tips. By the construction of the branches B and the swivel G' with the peripheral grooves I, I', and I², respectively, it will be observed that the gas is free to pass to the burner-tips at any time when the stop-cocks are open. To bring the light to a lower position, the cords or chains P are pulled downwardly to release the catches N, and pipes F F' may then be swung on their swivel-joints to bring the light to the position shown in dotted lines in Fig. 1.

It will be observed that various slight changes may be made in the details of construction without departing from the general spirit of my invention.

Having fully described my invention, what I claim as new, and desire to secure by Letters Patent, is—

In a gas-fixture, the combination of a main supply-pipe, two branch pipes arranged at the lower end thereof, two independently-movable drop-lights which are composed of two sections, one of which is independently swiveled on the end of each branch pipe, and both of which are attached to a swivel, the connection with the branch pipe and the said swivel being so constructed as to permit of the passage of gas through the drop-light at all positions of the same, brackets carried by said main supply-pipe and catches pivoted on said brackets and adapted to engage the swivel connection of the two sections of the said drop-lights and chains attached to said catches and extending below said branch pipes.

In testimony whereof I have signed my name to this specification in the presence of two subscribing witnesses.

MICHAEL HIRTH.

Witnesses:
   E. R. COBB,
   E. R. WINTER.